(12) United States Patent
Beresniewicz et al.

(10) Patent No.: US 8,095,514 B2
(45) Date of Patent: Jan. 10, 2012

(54) TREEMAP VISUALIZATIONS OF DATABASE TIME

(75) Inventors: John Beresniewicz, San Mateo, CA (US); Jonathan Helfman, Half Moon Bay, CA (US); Hsiao-Te Su, Palo Alto, CA (US); Nancy Chen, San Jose, CA (US); Karl Dias, Foster City, CA (US); Graham Wood, El Granada, CA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 12/365,827

(22) Filed: Feb. 4, 2009

(65) Prior Publication Data

US 2010/0198796 A1 Aug. 5, 2010

(51) Int. Cl.
*G06F 17/30* (2006.01)

(52) U.S. Cl. ........ 707/688; 715/853; 715/788; 715/764; 707/999.104

(58) Field of Classification Search .................. 715/853, 715/788, 764, 825, 738; 707/688, 999.003, 707/999.102, 999.104, 748; 709/218
See application file for complete search history.

(56) References Cited

U.S. PATENT DOCUMENTS

| | | | | |
|---|---|---|---|---|
| 6,496,832 B2 * | 12/2002 | Chi et al. | ............................... | 1/1 |
| 6,944,818 B2 * | 9/2005 | Newman et al. | ............... | 715/234 |
| 7,292,961 B2 | 11/2007 | Dias et al. | | |
| 7,346,628 B2 * | 3/2008 | Porter | ................................... | 1/1 |
| 7,376,682 B2 * | 5/2008 | Ramacher et al. | .................... | 1/1 |
| 7,716,227 B1 * | 5/2010 | Hao et al. | ...................... | 707/748 |
| 2005/0055673 A1 | 3/2005 | Dias et al. | | |
| 2008/0295038 A1 * | 11/2008 | Helfman et al. | ............... | 715/853 |
| 2009/0013270 A1 * | 1/2009 | Helfman et al. | ............... | 715/764 |
| 2009/0013271 A1 * | 1/2009 | Helfman et al. | ............... | 715/764 |
| 2009/0013281 A1 * | 1/2009 | Helfman et al. | ............... | 715/788 |
| 2009/0013287 A1 * | 1/2009 | Helfman et al. | ............... | 715/853 |

OTHER PUBLICATIONS

Olap visualization: Models, Issues and techniques, Alfredo et al., 2009.*
Ben Shneiderman "Tree Visualization with Tree-maps: a 2-d Space-filling Approach", Department of Computer Science and Human-Computer Interaction Laboratory, University of Maryland, Jun. 18, 1991; 10 pages.
SmartMoney—Map of the Market, obtained at http://www.smartmoney.com/map-of-the-market/.
Marumushi Newsmap, obtained at http://marumushi.com/apps/newsmap.
Stephen Heisig "Treemaps for Workload Visualization", published by the IEEE Computer Society, Mar./Apr. 2003; 8 pages.

* cited by examiner

*Primary Examiner* — Jean M Corrielus
(74) *Attorney, Agent, or Firm* — Trellis IP Law Group, PC

(57) ABSTRACT

Particular embodiments generally relate to displaying database time using a treemap. A set of database time values is determined for a set of dimensions. The database time values measure performance of one or more databases by the time the database takes to respond to a request. The set of database time values is correlated to a set of cells in the treemap. A size of the cell is determined based on the database time value associated with it. For example, the database time value is correlated to an area of the cell. A layout of the set of cells is determined and the treemap is displayed using the layout. For example, the largest values of database time may be shown with the largest sized cells. This makes it easier for an administrator to review and analyze the database performance across multiple dimensions and determine problem areas affecting the performance of the one or more databases.

20 Claims, 6 Drawing Sheets

TREEMAP VISUALIZATIONS OF DATABASE TIME

BACKGROUND

Particular embodiments generally relate to database management.

Improving the performance of a database system is a very important but time-consuming task for an administrator. Administrators must effectively prioritize the use of their limited time and attention. To do this, the administrators need to identify the most important systems from among hundreds or thousands of systems while still displaying the entire collection of the databases being managed. Also, within a system, the administrator needs to review different aspects that may be affecting database performance. Existing methods typically display the aspects of database performance in ordered lists or bar charts. These lists or charts are severely constrained in their scalability either to display many database systems or different aspects of a single database system simultaneously. For example, because of the large number of database systems or aspects of the database system being monitored, the list or bar chart may include a large amount of information that is off-screen. Thus, the administrator often needs to scroll the page up or down to see the entire bar chart or list, but the entire list or bar chart is not displayed on one page due to the size of the information. This requires repeated user interactions to identify the most important systems or aspects of a database.

SUMMARY

Particular embodiments generally relate to displaying database time using a treemap visualization. A set of database time values is determined over a set of dimensions. The database time values measure activity and performance of one or more databases by the time the database took to respond to requests during some period of database usage.

The set of dimensions may be one or more measures of the database performance. Also, the set of dimensions may be one or more database systems. The set of database time values is correlated to a set of cells in the treemap. A size of the cell is determined based on the database time value associated with it. For example, the database time value is correlated to an area of the cell. A layout of the set of cells is determined and the treemap is displayed using the layout. For example, the largest values of database time may be shown with the largest sized cells. This makes it easier for an administrator to review the database performance and determine problem areas affecting the performance of the one or more databases.

A further understanding of the nature and the advantages of particular embodiments disclosed herein may be realized by reference of the remaining portions of the specification and the attached drawings.

DETAILED DESCRIPTION OF EMBODIMENTS

Particular embodiments use database time values to generate a treemap. A treemap includes multiple cells that can display different dimensions of database time. The cell size of the treemap depends on the database time measurement. For example, larger database time values result in larger cell sizes in the treemap, where the relative sizing between cells is proportional to their relative amounts of DB Time. The cell sizes may be polygonal in shape, such as in a rectangular or square shape. Other shapes may also be appreciated. The layout of treemap cells allows for larger (i.e., more important) cells to be easily identified. Also, multiple dimensions (e.g., three or more) of database time may be displayed in the same treemap. This allows an administrator to quickly determine where the problem areas in database performance are.

The following description will describe an automatic database diagnostic monitor system (ADDM) and the measurement of database time. Then, the generation of a treemap using the database time values will be discussed.

Automatic Database Diagnostic Monitor

Figure 1:
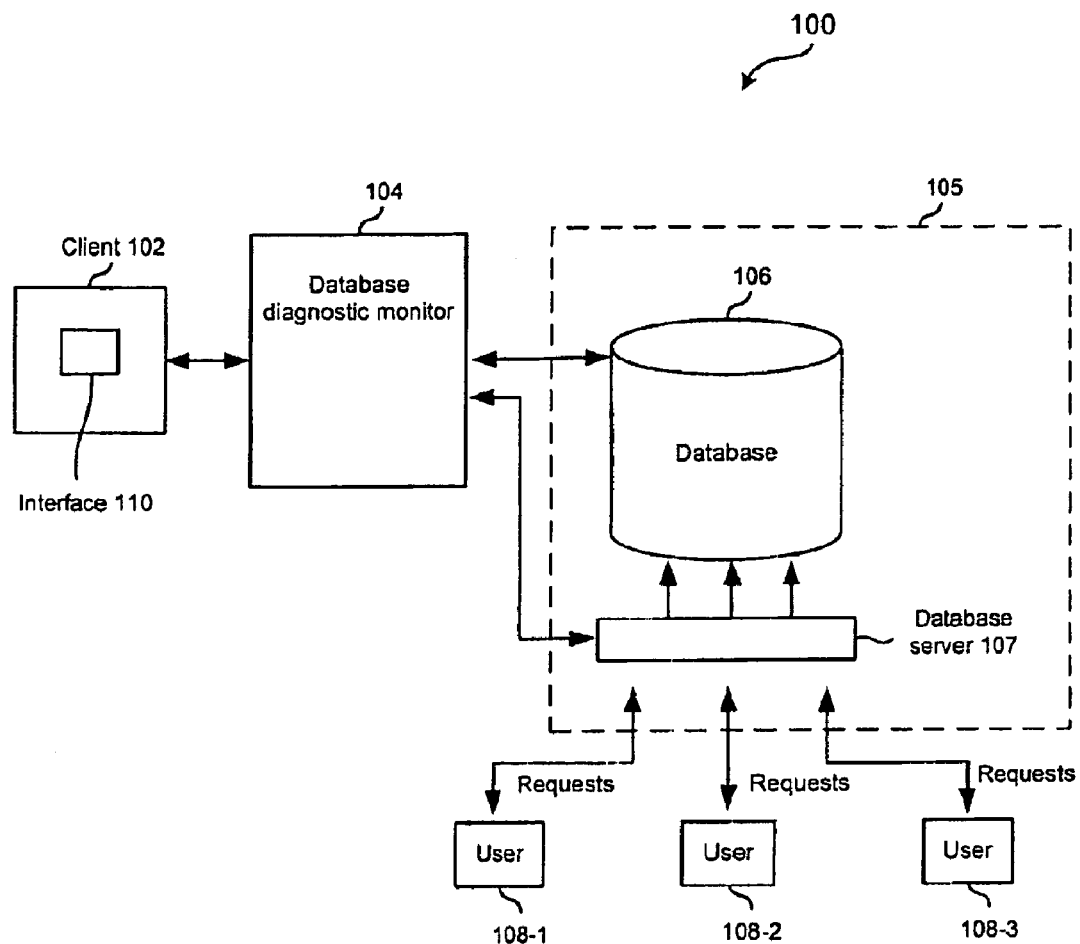
FIG. 1 depicts a system for diagnosing performance problems in a database system according to one embodiment.

FIG. 1 depicts a system 100 for diagnosing performance problems in a database system according to one embodiment. System 100 includes a client 102, an automatic database diagnostic monitor (ADDM) 104, a database system 105, and one or more users 108.

In one embodiment, database system 105 includes a database 106 and database server 107. Database server 107 is configured to receive and process requests for database 106. Database system 105 may be any database system and a person skilled in the art will appreciate other components and variations to database system 105.

Users 108 send requests for operations to be performed in database 106. The operations include reading data in database 106, writing data to database 106, updating data in database 106, etc. For example, the requests include SQL statements that cause operations to be performed in database 106. The interaction of the users 108 with database 106 using requests is known in the art and a person of skill in the art will appreciate how database systems may be used.

ADDM 104 is configured to perform a holistic analysis of operations that were performed in database system 105. ADDM 104 receives information for operations that were monitored in database 105. In one embodiment, the information includes statistics determined using a time model. The time model quantifies an impact of certain operations in database system 105. For example, the time model is used to determine time values that quantify the impact of operations in database system 105.

ADDM 104 is configured to perform a self-diagnosis of performance problems. The diagnosis includes determining a set of rules that detect and categorize one or more possible performance problems that may occur. Operations in database 106 are detected and information is recorded. Information collected is analyzed to determine if a condition is satisfied for a rule, thus indicating a performance problem associated with the rule may exist. In one embodiment, the condition may be satisfied when a threshold is reached. For example, when a certain time value for an operation is reached, the operation may be considered a performance problem. Also, the time value may be expressed as a certain percentage of time recorded for all operations. Other ways to measure the impact using the time values recorded may also be appreciated.

In one embodiment, ADDM 104 first reviews rules for general performance problems and then drills down to more narrow performance problems. Thus, a coarse granularity of performance problems is first reviewed and then finer granularities of the performance problems are reviewed until a root problem is identified. The root problem may be at any of the granularities reviewed and multiple root problems may be found.

In one embodiment, as will be described in more detail later, a performance problem classification system is reviewed to determine a root problem. In one embodiment, possible performance problems are determined and categorized in a structure, such as a rules tree. Each node of the tree has one or more rules associated with it along with conditions that determine whether the rules are satisfied. If a rule is satisfied at a node, a performance problem may exist.

In one embodiment, ADDM 104 traverses the rules tree by reviewing performance problems from a coarse granularity to a finer granularity. The rules tree may include symptoms, which are performance problems that may lead to other performance problems and to finally, a root performance problem. If a symptom does not lead to a root problem, the symptom may also be considered a root problem.

If a specific problem exists at one level of the rules tree, ADDM 104 may determine other nodes that are connected to the current node. These connected nodes are performance problems that are related to and may be the cause of the performance problem of the parent node. As ADDM 104 traverses the rules tree, finer granularities of performance problems are determined until a root problem is determined.

Once a problem is determined, a recommendation for a solution may be determined. In one embodiment, the solution may be determined using a set of recommendation rules. The operation that caused the problem may be determined and information captured about the processing that was performed in database system 105 for the operation may be retrieved. The information is reviewed and a recommendation rule is used to determine a recommendation for a solution for the problem. In one embodiment, the recommendation is specific to requests that caused the problem and is not a generic recommendation. For example, the recommendation may be change the request that caused the operation to be performed to a different request. Also, rationales for making the changes may be output. The rationales may be that a request is causing a certain operation to be performed or that a certain amount of time is being spent on some operations.

The time model will now be described. The time model is used to collect information that is used to quantify the impact of a performance problem in database system 105. The information is then used to determine performance problems in database system 105.

The Time Model

The time model is used to quantify of the impact of operations on database system 105. In one embodiment, the impact of operations is measured using time values. For example, the time value may measure the time spent processing an operation in database 106.

By quantifying the impact of operations in database system 105, a user may measure the impact of possible corrective actions before they are actually taken. For example, because operations are quantified in a time value, if an operation is corrected, the impact of correcting the operation is known because part of or all of the time spent on the operation may be eliminated.

In one embodiment, database time is measured using the time model. In one embodiment, database time is different from response time. The response time is the time a user 108 waits for a request to return from database system 105. Database time is the time spent in database server 107 servicing the request. In one embodiment, database time does not include the network portion of the user's response time. The network portion may include the time spent sending the request to database server 107 and the time spent to send the results to users 108. Also, parts of a request may be executed in parallel by different executing threads of database server 105. The threads are processes that operate to perform a task. If parts of the request are executed in parallel within the database system 105, the database time is the sum of all the time spent in the parallel executing threads of execution. This means that database time for a request executed in parallel may be much greater than the response time for the same request.

Operations that, when performed in database system 105, may be wasteful are determined. In one embodiment, an operation may be wasteful and may be attributed to some type of performance problem. For example, a wasteful operation may be an operation that does not need to be performed. Also, a wasteful operation may be an operation that may be performed more efficiently if performed in a different way. In one embodiment, operations that may be considered wasteful include hard parses, soft parses, configuration problems, improperly sized caches, and other operations. It will be understood that other operations may be appreciated.

In one embodiment, the time values spent on operations are stored in a database. The actual operations that were processed in database system 105 for which the time value was recorded may also be associated with the time value that is stored. Also, accumulated time values on time spent on all operations for each operation may be stored. For example, time may be accumulated by request types, such as by SQL statements. Thus, a when a certain SQL statement is performed, database time is recorded for the operation. In one embodiment, database time for a request that is performed for multiple users is recorded. An active session sample may then be used to determine users 108 that requested the operation when it is determined that the operation may be a performance problem. For example, a time value for a hard parse operation requested by a first user 108-1 may be stored. If another request by a user 108-2 caused a hard parse operation, a time value for that hard parse operation is stored. Also, an accumulated time value for hard parse operations that includes the time values from the hard parse operations associated with the requests for user 108-1 and user 108-2 is stored and associated with the general category of hard parse operations.

Figure 2:
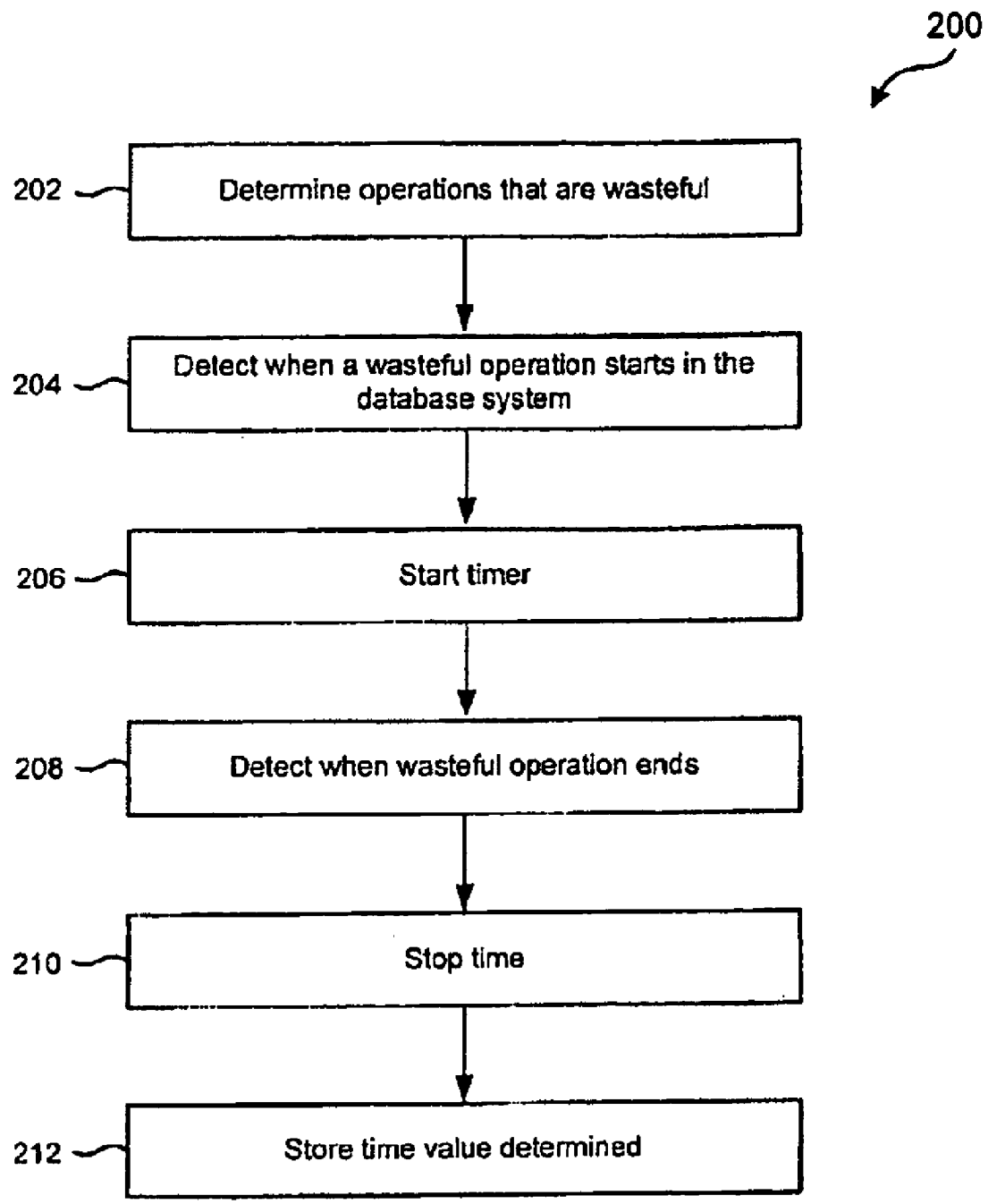
FIG. 2 depicts a simplified flowchart and a method for quantifying an impact of operations on the database system according to one embodiment

FIG. 2 depicts a simplified flowchart 200 and a method for quantifying an impact of operations on database system 105 according to one embodiment. In step 202, operations that would be wasteful are determined.

In one embodiment, rules associated with each operation may also be determined. The rules include conditions that are defined by the time model in determining when an operation is being performed. For example, a rule may include a condition that when a hard parse is being performed for a request, a hard parse operation is being performed.

In step 204, a condition check detects when an operation starts in database system 105. In one embodiment, when a condition is satisfied, an indication is made that an operation has begun.

In step 206, a timer for the operation is started. The operation may be timed using any methods capable of recording a time value, such as using a counter to time the operation. In one embodiment, the timer is started when the processing of an operation in database system 105 is detected. Thus, database time spent processing operations in database system 105 is recorded.

In step 208, a condition check detects that the operation ends. In one embodiment, when a condition is satisfied, an indication is made that an operation has ended. For example, a condition may be associated to an event that indicates when the operation ends.

In step 210, the timer for the operation is stopped. Accordingly, the time value that represents the time spent processing the operation in database system 105 has been recorded. The time value represents the time that is deemed to be wasteful for the operation that was performed. Accordingly, the timer may have timed the time spent processing operations in database system 105 rather than time spent waiting for a resource and time spent in communication between database server 105 and users 108.

In step 212, a time value for the time spent on the operation is stored. Also, the total time that is spent on certain category of an operation in database 106 may also be stored.

Generation of Treemap Using Database Time

Database time or average active sessions may be used to generate a tree map. It should be noted that when database time is described, this quantifies the time spent in the database to fulfill a request. Average active sessions may also represent time spent in a database. Average active sessions represents the average number of sessions that were active in the database over a certain time period. If average active sessions are determined, this can represent the amount of database time being used to fulfill operations.

The rate of accumulation of database time is comparable across database systems so an enterprise display of multiple systems can be assembled meaningfully into a treemap visualization prioritized by database time. Also, within a single database system, the database time accumulated over some time interval may be effectively visualized over multiple dimensions simultaneously. The visualization allows direct identification of dimensions with disproportionate accumulations, which are typically the largest performance impact on database performance. An administrator can thus determine potential tuning solutions by quickly looking at the treemap visualization.

The layout of the treemap cells includes rectangular or square shapes. Larger cells are generated for entities that use larger amounts of database time. The larger cells allow a user to easily see which cells are using the most database time. Also, the larger cells provide more area in which additional information can be displayed. For example, detailed diagnostic and tuning recommendations may be determined and displayed as textual information. This eliminates the need to drill down into the cell to determine the recommendations. A drill down may require a user to select the cell and a magnified display of the cell is provided. For smaller cells, a drill down may be provided in which a cell can be selected and the textual information displayed.

Particular embodiments allow for the display of many databases or instances in a database on a single screen visually prioritized by the database time they bear. Visualizing database time broken down across multiple dimensions is particularly useful for database performance tuning and problem diagnosis. The treemap facilitates rapid identification of likely problem sources from among hundreds of possibilities where the problem sources are prioritized by their impact on database time. Instead of the dimension limitations of conventional bar charts and lists, dimensions desired may be displayed on a single treemap. For example, three or more dimensions may be provided and used to generate a treemap. These dimensions are easily displayed within a single treemap instance, whereas conventionally, multiple bar charts may have been generated. For example, for three dimensions, a bar chart for the first and second dimensions is generated and then a second bar chart with the second and third dimensions is generated. This is because a bar chart cannot efficiently show a large number of dimensions. However, with a treemap, multiple dimensions may be displayed easily.

The dimensions may be hierarchical in nature. The hierarchical data may be data that may be organized in a tree-like structure. The treemap may display the hierarchical data as a set of nested rectangles. Each branch of the tree is assigned a rectangle or square cell. The cell is then tiled with smaller rectangles that represent other sub-branches. The area of a cell may be proportional to the time value of the specified dimension. For example, database time as measured by the dimension is used to determine the area of the cell.

Although database time is provided, it will be understood that other uses may be provided. For example, other database performance measures may be measured and displayed in a treemap. Any database performance metrics that are hierarchical and cumulative in nature and comparable cross systems or instances in a database may be used. For example, where systems share a common I/O subsystem, the number of total I/Os may be broken down hierarchically within the system or accumulated across systems.

Figure 3:
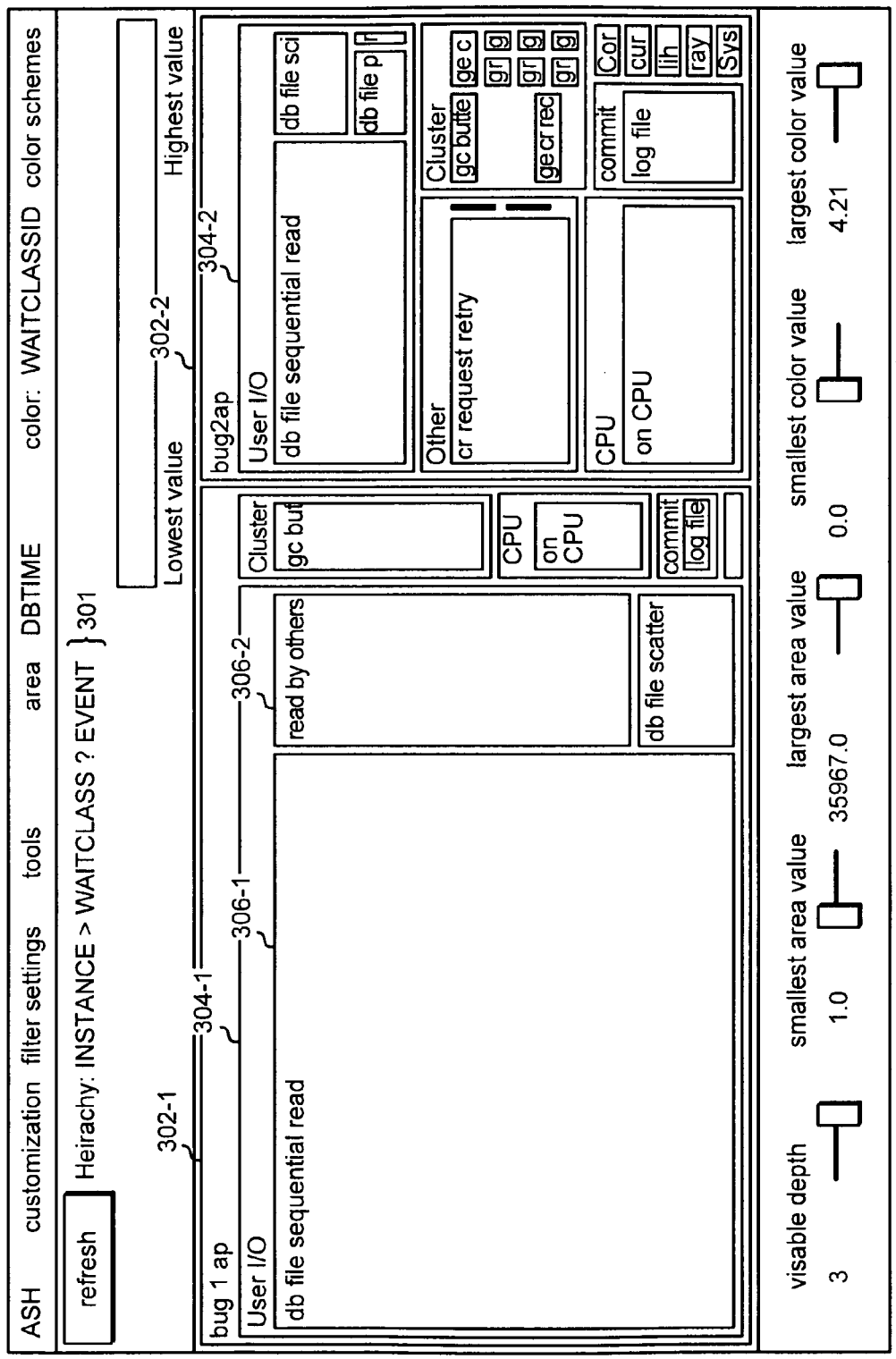
FIG. 3 shows an example of an interface used to display a treemap according to one embodiment.

FIG. 3 shows an example of an interface 300 used to display a treemap according to one embodiment. The treemap may be displayed based on the number of dimensions. The dimensions may be listed in a hierarchy. For example, the dimensions in this treemap are instance, wait class, and event and shown in area 301. Thus, the dimension of instance can be considered the root of the tree structure in the hierarchy, wait class is a sub-leaf and event is a sub-leaf of wait class. In the instance dimension, cells 302-1 and 302-2 are displayed. The size of these cells corresponds to database time values for the cell. In this case, for the instance, bug1ap, associated with cell 302-1, the time associated with the instance is larger than that of the instance, bug2ap, for cell 302-2, which causes a larger sized cell for 302-1 to be displayed.

The next dimension in the hierarchy is wait class. Wait class may be the database time associated with different classes. Cells 304 are tiled in cells 302 to show the hierarchy of wait class being a child of instance. The database time values for cells 304 correspond to the size of cells 304. For example, for the instance bug1ap, the database time spent for user input/output is defined. Also, for the instance bug2ap, the database time spent in user input/output is also shown. In this case, the database time spent for cell 304-1 is more than the database time spent for cell 302-2 as the area for cell 304-1 is larger. A user can view the treemap and easily see that database time spent for user input/output for bug1ap is larger than user input/output for bug2ap.

Within the wait class dimension, the dimension of event is shown. Events are the different events that are being processed in the database. Cells 306 quantify the amount of database time for this dimension. Cells 306 are a child of wait class in the hierarchy and are thus found within cells 304. As shown, a cell 306-1 for database file sequential reads for cell 304-1 quantifies the amount of database time spent for file sequential reads in the instance/wait class of bug1ap and user input/output. Cell 306-2 shows the database time spent for file sequential reads in the bug2ap/user input/output. An administrator can quickly see that database time spent for cell 306-1 was larger than for the instance bug1ap to bug2ap.

Other database time values are also displayed in the treemap. In one embodiment, all time values may be displayed in a single screen. This alleviates scrolling. Also, larger database time values are values that an administrator may be more interested in because problems with performance result when more database time is used for an operation. Thus, displaying smaller values in smaller cells, which may be hard to read, may be acceptable because an administrator does not need to review those values.

Figure 6:
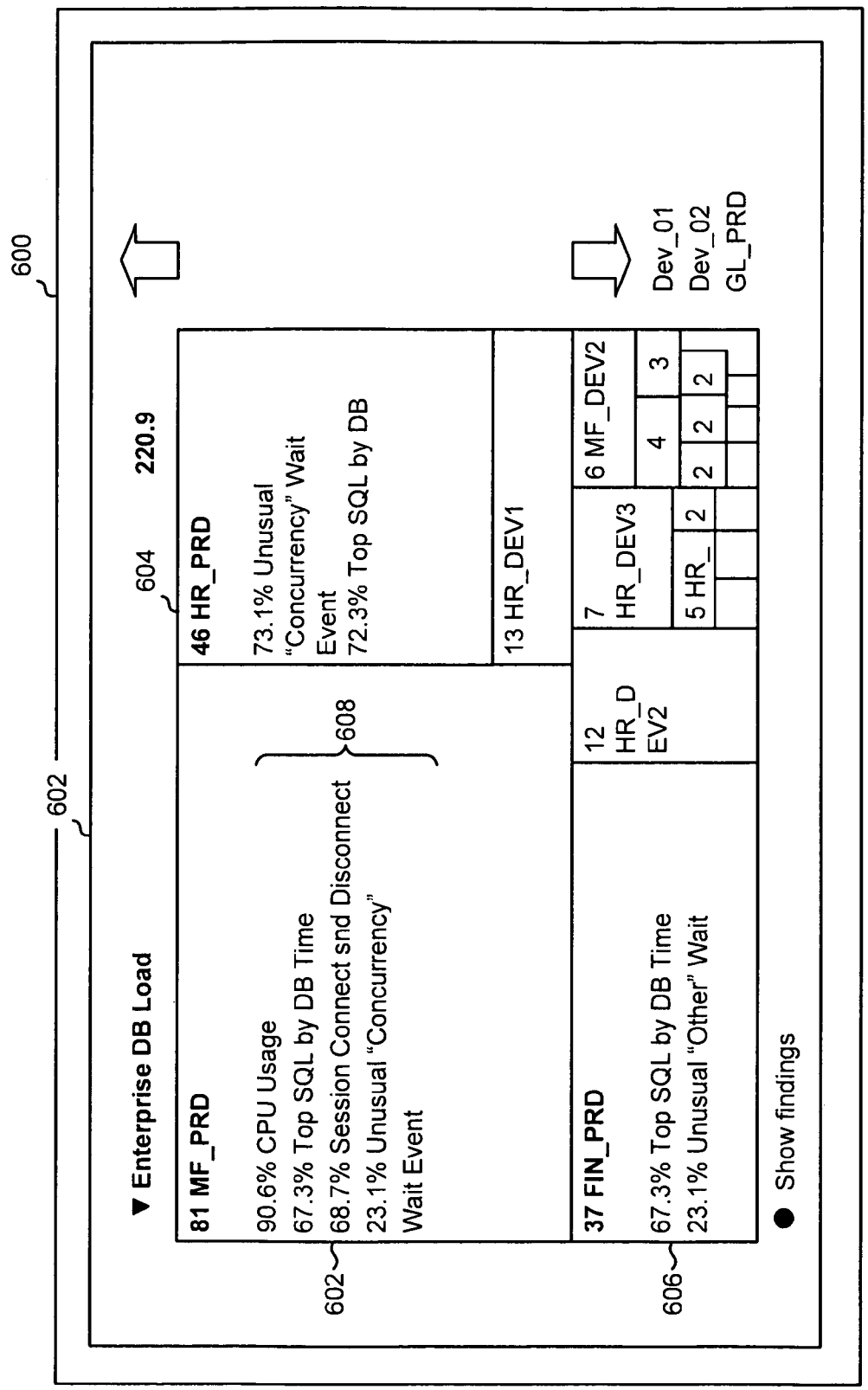
FIG. 6 shows another example of an interface displaying a treemap generated using active sessions according to one embodiment.

FIG. 6 shows another example of an interface 600 displaying a treemap generated using active sessions according to one embodiment. In treemap 602, active sessions are used as a dimension to generate the tree map. Sessions may be, over time, active or inactive. For example, in performing an operation, a session may be performing some type of act in database system 105, such as retrieving data. An operation may include many database calls, which are units of work within database system 105. For example, in performing an operation, such as a SQL statement, the operation may include various phases, such as parsing, executing; fetching results, that translate to database calls. A session may be inactive between database calls, such as data for the phase may not be available yet. A session may also be inactive between operations as a user sees it. For example, the time between when a request ends and a request is received is when a session is inactive as a user sees it. The total time spent in database calls is referred to as "database time or db time". The time between operation is called "response time" and this is the time the user waits. The key difference between the two is the time spent on the network. Eventually, the operation may be completed. When the operation has been completed, additional operations may be performed for session or the session may end.

The treemap may use the number of active sessions to determine the layout for the cells. More active sessions may indicate that an operation is using more database time. Thus, a larger cell is generated for the operation. As shown, a cell 602 has 81 active sessions. The cell has the most active sessions and is the largest in treemap 602. A cell 604 has 46 active sessions and is thus smaller.

Different information may be associated with a session. The information may include state information that provides the state of the request at the time. For example, the information includes information describing who a user 108 that requested the operation is (e.g., a user ID), what request (e.g., SQL command) is being processed, what the operation is doing (e.g., waiting, retrieving data, updating data, etc.), and other information. This information is useful when a performance problem is encountered and may be used to diagnose the problem. For example, certain requests and their activity may be viewed, how much time was spent on certain operations can be estimated, etc. and may be used in diagnosing a performance problem. This data may also be used to reconstruct the set of operations/activity in database system 105 for the time under consideration, etc. may be used in diagnosing a performance problem.

Information is captured from sessions at certain times during a time interval. For example, a time interval, such as every second, may be used for capturing information. At every interval, a session monitor captures information from sessions. Thus, a snapshot of information is captured at certain times rather than a full trace of activity. A sequence of snapshots may be referred to as a sample of the session history. A set of samples do not include all information but may be sufficient to determine the activity for sessions and the database as a whole. For example, if an operation is performing an action for three seconds, a snapshot at every second will capture information for the action. When a new action is started, the next snapshot captures information about the new action. Thus, what a session is doing over a period of time may be determined even though a full trace of information is not recorded. Consumers of the captured information may determine that the information is statistically significant by using well known statistical analysis before drawing conclusions.

In one embodiment, when the monitor determines it is time to capture information, information is captured for active sessions and not inactive sessions. By capturing information for all active sessions at certain time intervals, the monitor is able to capture information that may be best for diagnosing performance problems. The burden of capturing information for all sessions that are active is lessened because information is captured at certain intervals. This allows information for all active sessions 804 to be recorded. Also, the burden of capturing information is lessened because information for inactive sessions is not captured. Thus, the captured information may be manageable in that the size captured is smaller and the time taken to capture the information is shorter.

Treemap 602 may include any of the captured information in the cells. Because the area of the cells is larger for the more important cells, more information can be included in them. For example, cell 602 includes information 608 that indicates possible problems that have been diagnosed in the database.

Figure 4:
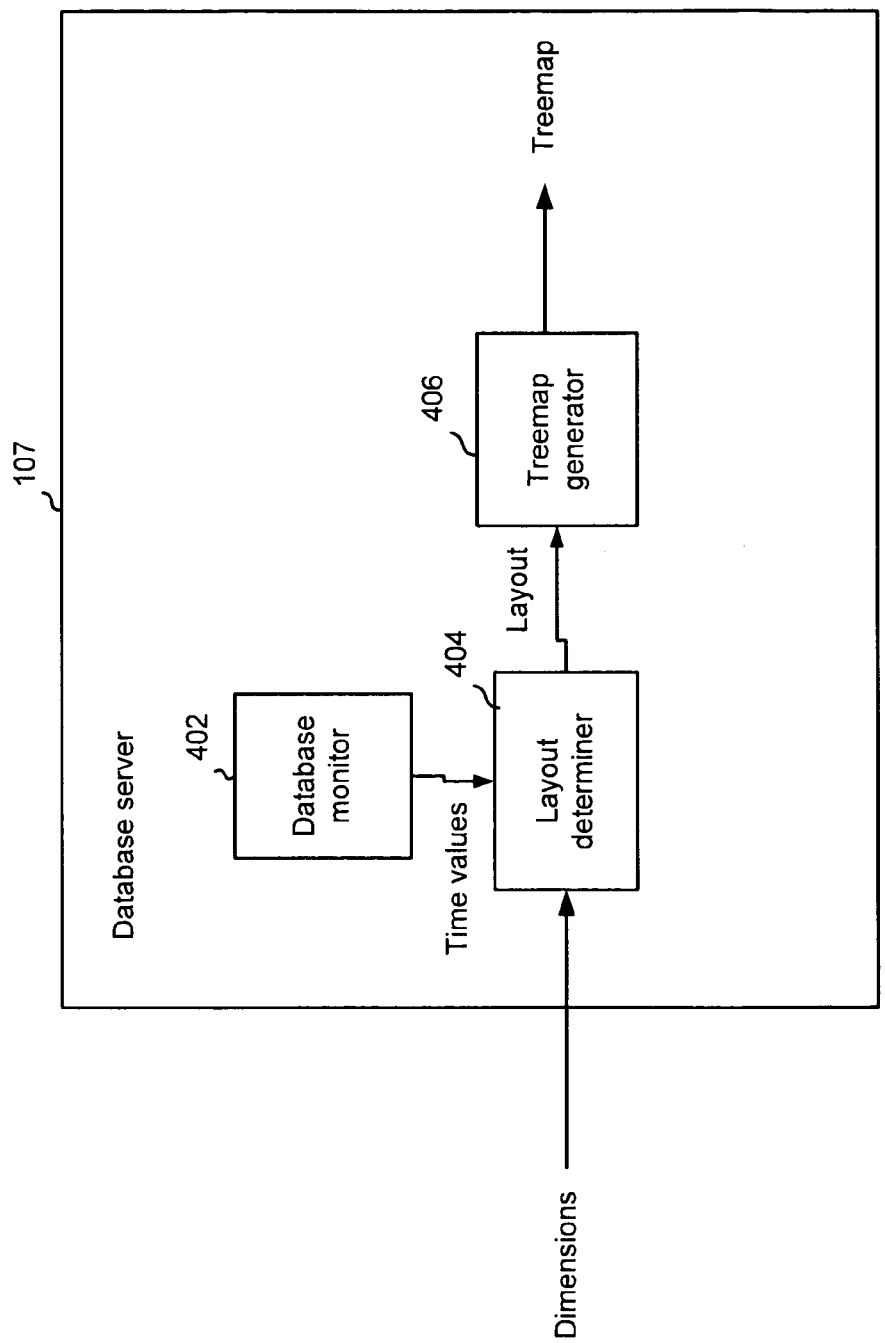
FIG. 4 depicts a more detailed example of database server according to one embodiment.

FIG. 4 depicts a more detailed example of database server 107 according to one embodiment. As shown, database server 107 includes a database monitor 402, a layout determiner 404, and a treemap generator 406.

Database monitor 402 is configured to determine database time as described above. The database time may be measured for a number of dimensions. For example, different hierarchies of database time may be determined.

Layout determiner 404 receives the time values and also a specification of dimensions. The dimensions may be a hierarchy of database time dimensions that a user specifies. The different dimensions may classify database time into different domains of interest. Examples of different hierarchies include database/instance/wait class for global performance monitoring, service/module/sequel identifier (SQLID) for application analysis and tuning, SQLID/instant/operation for global parallel query analysis, and other different database time hierarchies will be appreciated.

Layout determiner 404 may organize the database time values according to the hierarchy of dimensions. For example, for database/instance/wait class, the database time values for the dimension database are determined. Within each instance of database, the database time for instances is determined. Within each entity of instance, database time values for wait class are determined. These values are then analyzed to determine a layout for a treemap. For example, different heuristics are used to map the database time values for the hierarchy to position the cells.

The layout is then passed to treemap generator 406. Treemap generator 406 uses layout to generate the treemap. For example, the treemap may be generated and output on a user interface. The treemap captures all the database time values on a single screen. For example, a rectangular area is defined that includes the treemap where the rectangular area may be fit on the screen. Thus, unnecessary scrolling of the screen may not be needed because the treemap and all the database time values are captured in cells on the treemap.

The smallest cells are grouped into an aggregate cell for display as a unit in the parent treemap. Large collections of small cells may not display well in a standard treemap when cell sizes are sufficiently small. However, a drill down is allowed such that the user may drill down into cells. The drill down allows the user to magnify what is included in the cell. For example, if a cell includes five entities of database time within it, that cell may be drilled down to show how the five cells relate to each other. This mechanism enhances scalability of the user interface.

In addition, text information may be added to the cells. The text information may be alert messages on the database or instance, such as problems that may have been diagnosed for the database, such as ADDM 104. Because some cells are large in area, space is provided in which text information relevant to the entity may be inserted in the cell. The more important cells are larger in area and thus more information can be provided to the user in those cells. This is helpful because it may be expected that a user would want to have more information about the more important cells. Having more information also eliminates the requirement that a user drill down in the more important cells to receive more information. In one embodiment, the top three more important cells include text information. In addition, non-textual information may be displayed in the cells, such as images.

Coloring of the treemap may also be used to convey additional information. One implementation of colors is to classify or categorize the database time values. Three colors may be used to determine which database time is being used by the computer processing unit (CPU), input/output (I/O), wait, or other wait times. Other different colors could be wait class coloring from the Enterprise Manager (EM) performance page, mapping time to colors, mapping changes between successive views of treemaps to color, mapping alert levels when cells represent EM targets and mapping similarity to other difference from some baseline. Also, the coloring may be based on other aspects of the dimensions.

Figure 5:
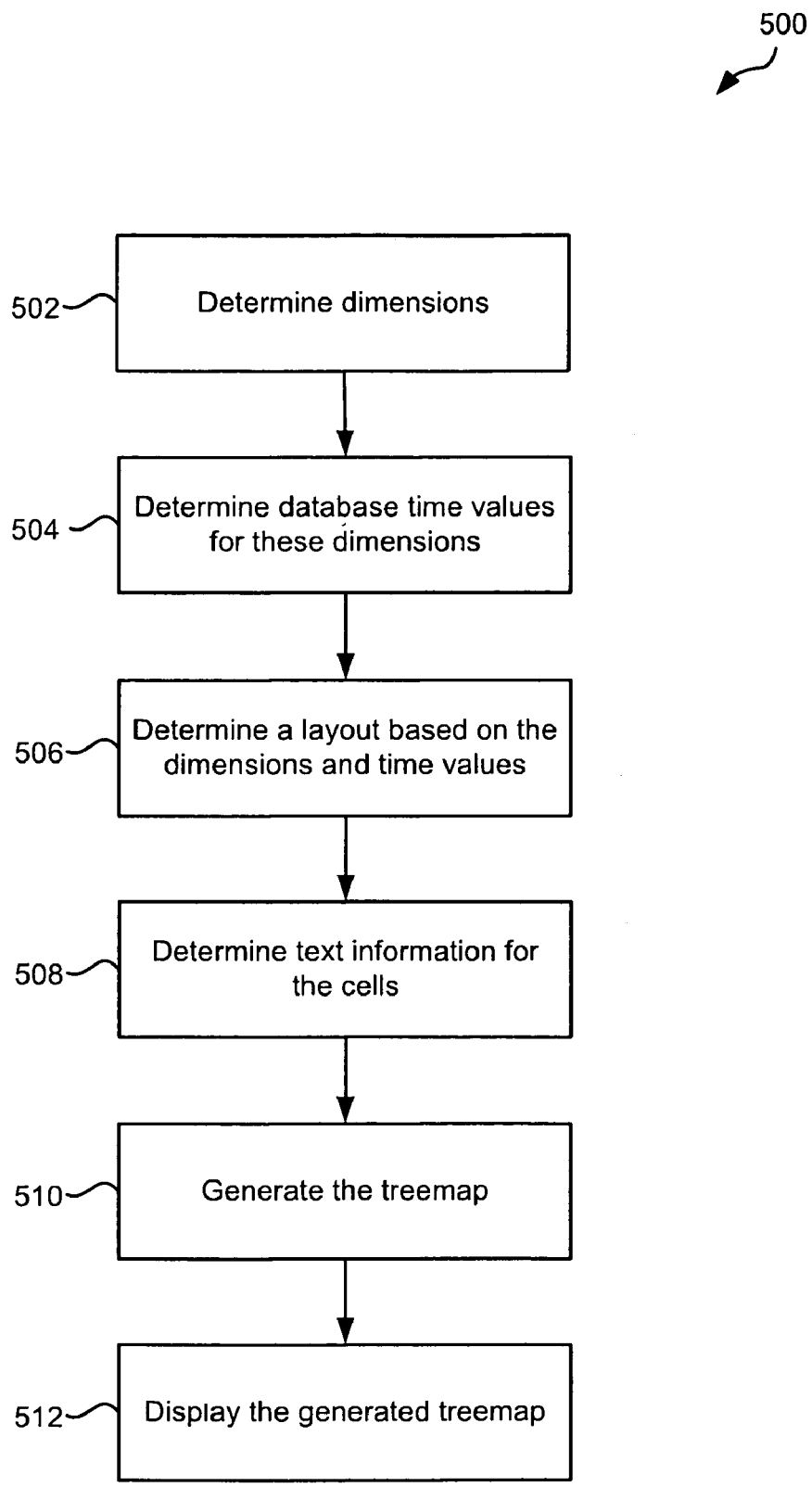
FIG. 5 depicts a simplified flowchart of a method for generating a treemap according to one embodiment.

FIG. 5 depicts a simplified flowchart 500 of a method for generating a treemap according to one embodiment. Step 502 determines dimensions. For example, the dimensions may be determined based on input from a user. For example, the user may input the hierarchy of dimensions that are desired. Also, database server 107 may automatically determine dimensions in which to generate the treemap. For example, an analysis of database time may predict which dimensions may be most useful for a user to diagnose database problems or use.

Step 504 determines database time values for these dimensions. For example, the database time values may be determined based on instances found in the dimensions provided.

Step 506 determines a layout based on the dimensions and time values. For example, the size of the cells based on the database time is determined. Also, the layout of where to position the cells is determined. For example, cells may be positioned in a way that is determined to be most readable for the user. Also, when multiple treemaps are being generated in a succession for the same dimensions, the system may attempt to place the same cells for the same entities in the same position. This may make it easier for a user to determine changes in database time for the performance.

Step 508 determines text information for the cells. For example, any information that is deemed useful for analyzing a database problem may be determined as text information. By providing the text information in the cells, this eliminates the need for a user to drill down to another view of the treemap.

For cells where text information is not inserted in cells, but further information is provided, drill down information is determined. This is information that allows a user to select a cell and be provided with additional information. For example, the drill down information may allow more information about the cell to be displayed. This may include detailed diagnostic and tuning recommendations for the cell.

Step 510 generates the treemap. In generating the treemap, the layout is used and also text and links to the drill down information are generated for the treemap.

Step 512 then displays the generated treemap.

Although the description has been described with respect to particular embodiments thereof, these particular embodiments are merely illustrative, and not restrictive. Although database time is described, it will be understood that other values may be used to generate and display the treemap.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for displaying database time, the method comprising:
   determining a set of database time values for a plurality of dimensions, where database time measures time taken to service requests for one or more databases;
   correlating the set of database time values to a set of cells in a treemap, wherein a cell in the set of cells corresponds to a database time value in the set of database time values, where size of the cell is determined based on size of the database time value;
   determining a layout of the set of cells based on sizes of the set of cells; and
   displaying the treemap using the layout of the cells, the cells being sized based on database time values associated with the cells.

2. The method of claim 1, wherein database time comprises time spent processing an operation by a database server for the one or more databases.

3. The method of claim 1, wherein larger values of database time values are displayed in larger sizes of cells.

4. The method of claim 1, further comprising adding an identifier to the cell identifying an entity associated with an operation in which database time was measured.

5. The method of claim 1, wherein the plurality of dimensions form a hierarchy of dimensions.

6. The method of claim 1, wherein the plurality of dimensions form a plurality of layers in the treemap based on the hierarchy.

7. The method of claim 1, further comprising adding text information to the cell.

8. The method of claim 1, further comprising coloring the set of cells in the treemap based on plurality of dimensions associated with the cells.

9. The method of claim 1, further comprising.
   receiving a selection of a cell; and
   displaying a magnified version of the treemap including a magnified version of the cell and any cells found in the cell.

10. The method of claim 1, wherein determining database time comprises:
    determining, at a plurality of points during a time interval, a number of active sessions for the requests; and
    determining the database time values based on the number of active sessions.

11. A computer-readable medium comprising encoded logic for execution by the one or more processors to display database time, the logic when executed operable to:
    determine a set of database time values for a plurality of dimensions, where database time measures time taken to service requests for one or more databases;
    correlate the set of database time values to a set of cells in a treemap, wherein a cell in the set of cells corresponds to a database time value in the set of database time values, where size of the cell is determined based on size of the database time value;
    determine a layout of the set of cells based on sizes of the set of cells; and
    display the treemap using the layout of the cells, the cells being sized based on database values associated with the cells.

12. The computer-readable medium of claim 11, wherein database time comprises time spent processing an operation by a database server for the one or more databases.

13. The computer-readable medium of claim 11, wherein larger values of database time values are displayed in larger sizes of cells.

14. The computer-readable medium of claim 11, wherein the logic when executed is further operable to add an identifier to the cell identifying an entity associated with an operation in which database time was measured.

15. The computer-readable medium of claim 11, wherein the plurality of dimensions form a hierarchy of dimensions.

16. The computer-readable medium of claim 11, wherein the plurality of dimensions form a plurality of layers in the treemap based on the hierarchy.

17. The computer-readable medium of claim 11, wherein the logic when executed is further operable to add text information to the cell.

18. The computer-readable medium of claim 11, wherein the logic when executed is further operable to color the set of cells in the treemap based on the plurality of dimensions associated with the cells.

19. The computer-readable medium of claim 11, wherein the logic when executed is further operable to:
    receive a selection of a cell; and
    display a magnified version of the treemap including a magnified version of the cell and any cells found in the cell.

20. An apparatus configured to display database time, the apparatus comprising:
    means for determining a set of database time values for a plurality of dimensions, where database time measures time taken to service requests for one or more databases;
    means for correlating the set of database time values to a set of cells in a treemap, wherein a cell in the set of cells corresponds to a database time value in the set of database time values, where size of the cell is determined based on size of the database time value;
    means for determining a layout of the set of cells based on sizes of the set of cells; and
    means for displaying the treemap using the layout of the cells, the cells being sized based on database values associated with the cells.

* * * * *

UNITED STATES PATENT AND TRADEMARK OFFICE
CERTIFICATE OF CORRECTION

PATENT NO. : 8,095,514 B2
APPLICATION NO. : 12/365827
DATED : January 10, 2012
INVENTOR(S) : Beresniewicz et al.

It is certified that error appears in the above-identified patent and that said Letters Patent is hereby corrected as shown below:

In column 11, line 39, in Claim 9, delete "comprising." and insert -- comprising: --, therefor.

Signed and Sealed this
Twenty-seventh Day of March, 2012

David J. Kappos
*Director of the United States Patent and Trademark Office*